United States Patent
Kim et al.

(10) Patent No.: US 9,815,348 B2
(45) Date of Patent: Nov. 14, 2017

(54) METHOD OF CONTROLLING AUTOMOTIVE AIR CONDITIONING SYSTEM

(71) Applicant: Hyundai Motor Company, Seoul (KR)

(72) Inventors: Jae Woong Kim, Hwaseong-si (KR); Jae Woo Park, Ansan-si (KR); Man Ju Oh, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 130 days.

(21) Appl. No.: 14/709,362

(22) Filed: May 11, 2015

(65) Prior Publication Data
US 2016/0167480 A1 Jun. 16, 2016

(30) Foreign Application Priority Data
Dec. 10, 2014 (KR) .......................... 10-2014-0177464

(51) Int. Cl.
*B60H 1/00* (2006.01)

(52) U.S. Cl.
CPC ..... *B60H 1/00971* (2013.01); *B60H 1/00742* (2013.01); *B60H 1/00964* (2013.01); *B60H 2001/00992* (2013.01)

(58) Field of Classification Search
None
See application file for complete search history.

(56) References Cited

U.S. PATENT DOCUMENTS

| | | | | |
|---|---|---|---|---|
| 5,553,661 A * | 9/1996 | Beyerlein | .......... | B60H 1/00735 165/11.1 |
| 5,632,156 A * | 5/1997 | Takeo | .................. | B60H 1/3205 62/160 |
| 6,488,213 B2 * | 12/2002 | Ohga | ................. | B60H 1/00971 165/247 |
| 7,849,703 B2 * | 12/2010 | Takeda | ............... | B60H 1/00735 62/161 |
| 2009/0037002 A1 * | 2/2009 | Tateishi | ................. | G05B 17/02 700/31 |

(Continued)

FOREIGN PATENT DOCUMENTS

| JP | H05-091921 U | 12/1993 |
|---|---|---|
| JP | 2007-001321 A | 1/2007 |

(Continued)

OTHER PUBLICATIONS

Korean Office Action dated Dec. 11, 2015 issued in Korean Patent Application No. 10-2014-0177464.

(Continued)

*Primary Examiner* — Demetra Smith-Stewart
(74) *Attorney, Agent, or Firm* — McDermott Will & Emery LLP

(57) ABSTRACT

A method of controlling an automotive air conditioning system includes: a mode checking step of checking whether the air conditioning system is in an auto-mode; an operation recognizing step of recognizing whether the air conditioning system is manually operated in the auto-mode; and a learning step of setting and storing at least one manual operation value, when the air conditioning system is manually operated, and then operating the air conditioning system in accordance with the at least one stored manual operation value in a next auto-mode.

12 Claims, 3 Drawing Sheets

(56) References Cited

U.S. PATENT DOCUMENTS

2015/0165966 A1\* 6/2015 Choi .................... B60Q 1/122
                                                            315/77

FOREIGN PATENT DOCUMENTS

| JP | 2008-100665 A | 5/2008 |
|----|---------------|--------|
| KR | 10-2000-0055778 A | 9/2000 |
| KR | 10-2007-0082933 A | 8/2007 |
| KR | 10-2008-0026375 A | 3/2008 |
| KR | 10-2010-0022693 A | 3/2010 |

OTHER PUBLICATIONS

Korean Office Action dated Apr. 27, 2016 issued in Korean Patent Application No. 10-2014-0177464.

\* cited by examiner

METHOD OF CONTROLLING AUTOMOTIVE AIR CONDITIONING SYSTEM

CROSS REFERENCE TO RELATED APPLICATION

The present application claims priority of Korean Patent Application Number 10-2014-0177464 filed on Dec. 10, 2014, the entire contents of which application are incorporated herein for all purposes by this reference.

TECHNICAL FIELD

The present invention generally relates to a method of controlling an automotive air conditioning system that supplies air according to the preferences of users in an auto-mode of the system.

BACKGROUND

Automotive air conditioning systems have an auto-mode for automatically controlling temperature and the auto-mode provides convenience of a user by automatically controlling several components in an air conditioning system in accordance with a predetermined amount of air and temperature thereof so that the user does not need to individually operate the components.

The auto-mode of the related art controls components by controlling the amount of air and a blowing mode in accordance with temperature set by a user. However, since predetermined values are used, users may feel the amount of air different, too much or too less, even though they set the same temperature, so it is difficult to satisfy all users. Further, users have to manually set the appropriate amount of air and modes, even though they use an automatic temperature control function, so the automatic temperature control function is used less and convenience for the users is deteriorated.

The foregoing is intended merely to aid in the M understanding of the background of the present invention, and is not intended to mean that the present invention falls within the purview of the related art that is already known to those skilled in the art.

SUMMARY

Accordingly, embodiments of the present invention have been made keeping in mind the above problems occurring in the related art, and the present disclosure is intended to propose a method of controlling an automotive air conditioning system that is operated according to individual preferences of users.

In order to achieve the above object, according to one aspect of the present invention, a method of controlling an automotive air conditioning system includes: a mode checking step of checking whether the air conditioning system is in an auto-mode; an operation recognizing step of recognizing whether the air conditioning system is manually operated in the auto-mode; and a learning step of setting and storing a manual operation value, when the air conditioning system is manually operated, and then operating the air conditioning system in accordance with the stored manual operation value in a next auto-mode.

In certain embodiments, the operation recognizing step may include detecting whether the air conditioning system has been operated for set values related to setting of an amount of air, setting of temperature, setting of internal/external air mode, setting of the air conditioning system, or setting of blowing mode.

In certain embodiments, the method may further include a load determining step of determining an one or more air-conditioning load values, and the learning step may further include storing one or more of the air-conditioning load values when the air conditioning system is operated.

In certain embodiments, the method may further include a mode performing step of performing the auto-mode in accordance with one or more performance values corresponding to at least one of the determined air-conditioning load values.

In certain embodiments, one of the manual operation values may be equal to or larger than lowest set values determined for each of the air-conditioning load values.

In certain embodiments, the method may further include a reset step of detecting reset signals and, when the reset signals are detected, resetting all the stored manual operation values, and the mode performing step includes performing the auto-mode in accordance with a set reference value set for each of the air-conditioning load values, when the mode performance values are reset.

In certain embodiments, a set reference value may be provided for each of the air-conditioning load values, and the learning step may include determining and storing an intermediate value between a first manual operation value and the set reference value corresponding to one of the air-conditioning load values, the set reference value being close to the first manual operation value or between the first manual operation value and another manual operation value close to the first manual operation value.

In certain embodiments, the intermediate value may be determined by interpolation.

In certain embodiments, the at least one mode performance value may be a first stored manual operation value, a set reference value, a first intermediate value between the first stored manual operation value and the set reference value, or a second intermediate value between the first stored manual operation value and a second stored manual operation value.

In certain embodiments, the at least one mode performance value may be the first intermediate value or the second intermediate value.

In certain embodiments, in the load determining step, the load may be determined using the equation $$Q_{AC} = M_r C_p \frac{dT_r}{dt} - \{-m_l(h_a - h_r) - Q_{env} - Q_i - Q_{solar} - Q_{ENG} - Q_{etc}\},$$

where $Q_{A/C}$ is an amount of heat to be supplied or removed, $M_r$ is the mass of interior air, $C_p$ is the specific heat of air, $T_r$ is an interior temperature, t is time, $m_l$ is a flow rate of leaking air, $h_a$ is the enthalpy of external air, $h_r$ is the enthalpy of the interior air, $Q_{env}$ is a degree of cooling or heating by external convection, $Q_i$ is an amount of heat of at least one interior device, $Q_{solar}$ is an amount of radiant heat from the sun, $Q_{eng}$ is an amount of heat received from an engine, and $Q_{etc}$ is an amount of other possible heat.

In certain embodiments, $Q_{A/C}$ may include the sum of an amount of heat required for the interior temperature to reach to a set temperature and an amount of heat required to maintain the interior temperature at the set temperature.

In certain embodiments, $Q_{etc}$ may include the heat of a human body.

According to certain embodiments of the method of controlling an automotive air conditioning system having the configuration described above, since the amount of air and the blowing mode can be determined appropriately for the individual preferences of users, it is possible to improve convenience and satisfaction for the users.

Further, it is possible to increase usability of the auto-mode with minimum manual operation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
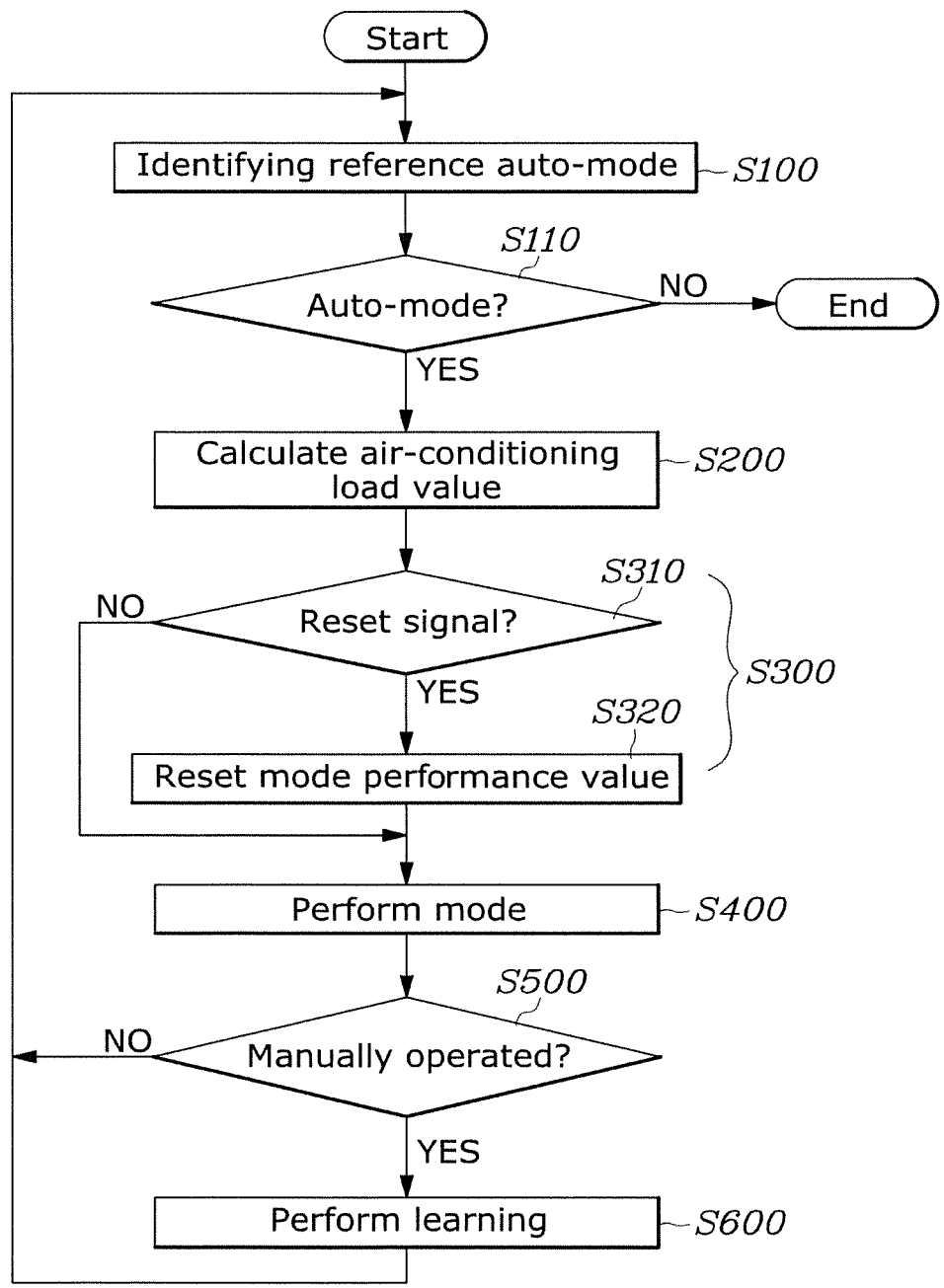
FIG. 1 is a flowchart showing a method of controlling an automotive air conditioning system according to an embodiment of the present invention.

A method of controlling an automotive air conditioning system according to an embodiment of the present invention is described hereafter with reference to the accompanying drawings. The term air conditioning as used herein may refer to cooling or heating. FIG. 1 is a flowchart showing a method of controlling an automotive air conditioning system according to an embodiment of the present invention. The method includes: a mode checking step S110 of checking whether an air conditioning system is in an auto-mode; an operation recognizing step S500 of recognizing whether the air conditioning system is manually operated in the auto-mode; and a learning step S600 of storing a set operation value, when the air conditioning system is operated, and then operating the air conditioning system in accordance with the stored set operation value in the next auto-mode. The next auto-mode means an auto-mode performed after the current auto-mode is finished.

In detail, the mode checking step S110 can detect whether an auto-mode start switch has been operated or a blowing switch has been operated with an auto-mode preset as a reference mode at step S100, and can determine that the auto-mode is operated when the switch is operated.

A load determining step S200 of determining an air-conditioning load value may be performed, when the auto-mode is in operation, and the entire amount of heat to be removed or added by the air conditioning system to maintain a set temperature may be calculated first in the load determining step S200. The entire amount of heat may be calculated from the following equation.

$$Q_{AC} = M_r C_p \frac{dT_r}{dt} - \{-m_l(h_a - h_r) - Q_{env} - Q_i - Q_{solar} - Q_{ENG} - Q_{etc}\} \quad \text{[Equation 1]}$$

where $Q_{A/C}$ is the amount of heat necessary to be supplied or removed by air conditioning. In certain embodiments, $Q_{A/C}$ may be expressed as the sum of the amount of heat required for an interior temperature to reach to a set temperature and the amount of heat required to maintain the interior temperature against an air-conditioning load value due to external conditions such as the amount of sunlight and the interior conditions. Further, $m_r$ is the mass of interior air, $c_p$ is the specific heat of air, $T_r$ is the interior temperature, t is time, $m_l$ is the flow rate of leaking air, $h_a$ is the enthalpy of external air, $h_r$ is the enthalpy of interior air, $Q_{env}$ is the degree of cooling or heating by external convection, $Q_i$ is the amount of heat of interior devices such as a seat, $Q_{solar}$ is the amount of radiant heat from the sun, $Q_{eng}$ is the amount of heat by an engine, and $Q_{etc}$ is the amount of other possible heat including the heat of a human body. In Equation 1, $m_l(h_a - h_r)$ is the amount of heat leaked to the outside by air-conditioning, $m_r * c_p * (dT_r/d_t)$ is the amount of heat for the interior temperature to reach a set temperature, and the other terms except $m_r * c_p * (dT_r/d_t)$ at the right side are values all corresponding to the air-conditioning load values. That is, in the load determining step S200, the amounts of heat corresponding to air-conditioning load values can be calculated from Equation 1.

The terms may be calculated in advance by tests and each may include a variable. For example, the amount of leaking heat may depend on the amount of air and the vehicle speed, $Q_{env}$ may depend on the vehicle speed, $Q_{solar}$ may depend on the amount of light, $Q_{eng}$ may depend on the operation state of the engine, and $Q_{etc}$ may depend on the number of passengers. The terms may be positive values when heat is supplied to the interior of a vehicle, but they are negative values when heat is removed from the interior of a vehicle, such that the entire amount of heat for air conditioning to be supplied to the interior and the air-conditioning load value can be calculated from Equation 1 and heating or cooling and the amount of air can be set on the basis of the result of the calculation. Therefore, a variable is detected for each amount of heat and accordingly a predetermined amount of heat can be calculated, so that the total air-conditioning load value can be calculated.

As can be seen from Equation 1, the total air-conditioning load value is determined by external factors and is a minimum amount of heat for maintaining an interior temperature at a set temperature even under a change in external environment, when the interior temperature reaches a set temperature, and a lowest set value to be described below may be a combination of the set values of the air conditioning system necessary for satisfying (i.e. supplying or removing) the minimum amount of heat to maintain the interior temperature.

Further, a set reference value (or the set operation value) to be described below may be the upper limit of the set values of the air conditioning system which are necessary for satisfying the amount of heat for changing the interior temperature to the set temperature, when the interior temperature is not equal to the set temperature.

Figure 2:
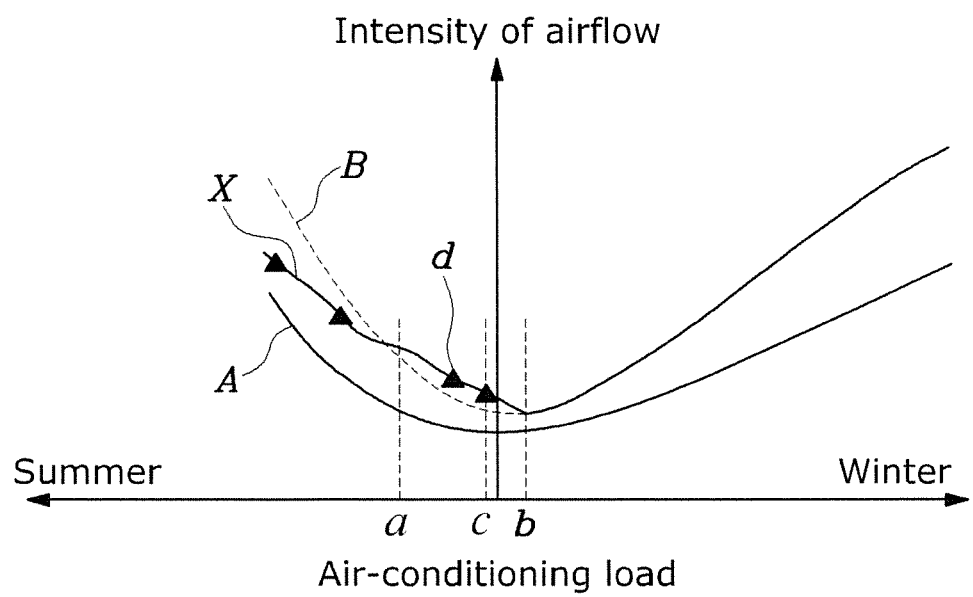
FIG. 2 is a diagram showing set values corresponding to air-conditioning load values at predetermined amounts of air.

Accordingly, as shown in FIG. 2, in summer and winter, the difference between the set temperature and the interior temperature is large and the change in necessary amount of heat due to the external environment is also large, so the air-conditioning load values, and the lowest set value A and the set reference value B corresponding to the loads are increased. However, in spring and fall, the difference between the interior temperature and the set temperature is not large, and the air-conditioning load values, and the lowest set value A and the set reference value B corresponding to the loads are decreased.

The method may include the load determining step S200 and a mode performing step S400 of performing the auto-mode in accordance with a stored set value corresponding to a determined air-conditioning load value.

That is, when an air-conditioning load value is determined, setting of the amount of air, setting of the internal/external air mode, setting of the air conditioning system, and setting of the blowing mode are determined in accordance with the stored set value corresponding to the determined air-conditioning load value and each mode is performed in accordance with the stored set value. Accordingly, a user can use the value that he/she has set before without specific manual work, so convenience for the M user and reliability of the auto-mode can be improved. The stored set value is a value stored in advance in a previous learning step and will be described below.

in certain embodiments, before the mode performing step S400, a reset signal may be detected at reset step S300 between the load determining step S200 and the mode performing step S400. The reset step S300 includes detecting whether a reset signal has been supplied (step S310), and a step S320 of resetting all of the stored set values when a reset signal has been supplied. Accordingly, the mode performing step S400 can perform the auto-mode in accordance with a set reference value for each air-conditioning load value, when the stored set values are reset.

The set reference values may not be set values manually stored by a user, but set values for air-conditioning load values determined through tests by the manufacturer, and may be determined in accordance with the amount of heat for the interior temperature calculated from Equation 1 to reach a set temperature.

When it is an auto-mode, an operation recognizing step 9500 of detecting whether the air conditioning system is manually operated may be performed, after the mode performing step S400.

The operation recognizing step S500 can detect whether the air conditioning system has been operated for set values in one or more of the setting of the amount of air, setting of temperature, setting of the internal/external air mode, setting of the air conditioning system, and setting of the blowing mode, and whether the air conditioning system has been operated to set other factors may be further detected. The setting of the amount of air may be to adjust the intensity of airflow, the setting of the internal/external air mode may be to convert an indoor unit and an outdoor unit, and the setting of the air conditioning system may be to turn on or off the air conditioning system, and the setting of the blowing mode may be to set whether to open various airflow passages such as a vent, a floor, a roof, and a defrost vent or set the opening amount of them. The operation recognizing step S500 can detect whether a user operates switches for the settings, and then determine a value has been manually set, when a switch is operated or when a set value different from the set reference value is recognized.

When there is an operation, a learning step S600 of storing the set value and operating the air conditioning system in accordance with the stored set value in the next auto-mode may be performed. The learning step S600 can further store the air-conditioning load value when the air conditioning system starts to be operated so that the mode performing step S400 can be performed in accordance with a stored set value corresponding to an air-conditioning load value that is matched M with the stored air-conditioning load value and determined in the next load determining step S200. Set reference values determined in advance or values calculated by an interpolation described below may be used for the values that are not manually set.

IS In the learning step S600, when values are repeatedly manually set for the same air-conditioning load value until the auto-mode is finished after being started, the latest set value may be stored to be used in the next mode performing step S400, or the average of the values repeatedly set for the same air-conditioning load value may be calculated to be used in the next mode performing step S400. However, an average can be calculated for the setting of the amount of air or the setting of temperature, but not for the setting of on/off-control or the setting of a blowing mode, and accordingly, the latest set value may be used for the setting in which calculation of an average is impossible or ineffective, depending on the intention of the designer. Further, those skilled in the art may determine which set value to use in various ways.

In the learning step S600, the set operation value may be stored to have a value over the lowest set value determined for each air-conditioning load value. That is, when the set operation value is lower than a lowest set value determined in advance by the manufacturer, it is stored to have a value higher than the lowest set value. The absolute values of the set operation value and the lowest set value may be compared and the larger absolute value may be stored. Obviously, the set value is stored according to whether it is negative or positive.

Various setting modes are described hereafter. FIG. 2 is a diagram showing set values corresponding to air-conditioning load values at predetermined amounts of air, in which the line A indicates the lowest set value, the line B indicates the set reference value, and the line X indicates the set value manually determined by a user.

As can be seen from FIG. 2, when all of set values are reset or there is no manual operation for air-conditioning load values, the amount of air can be adjusted in the range between the predetermined set reference value and the lowest set value. The lowest set value may be a value for providing the amount of air for maintaining a temperature when an interior temperature reaches a required temperature, and the set reference value may be the upper limit of the amount of air for addition operation when the interior temperature fails to reach the required temperature.

Accordingly, for example when the auto-mode is performed in summer, if the interior temperature is higher than a set temperature and there is no value set by manual operation, the amount of air matching with the set reference value is provided first and very strong wind is discharged for cooling as rapid as possible. Further, when a user thinks the amount of air is too large and manually operate the air conditioning system such that the amount of air decreases, as indicated by the line B, the learning step S600 stores the set operation value so that the amount of air corresponding to the set operation value that is the maximum discharge value for the same air-conditioning load value can be discharged in the next auto-mode. Further, since the set operation value is the upper limit, it may be possible to determine the amount of air by selecting any one of values set between the predetermined lowest set value and the set operation value.

This is similar even when the set operation value determined by manual operation is larger than the set reference value, and when the set operation value is the lowest set value or less, the set operation value may be removed and the lowest set value may be stored to be used in the next mode performing step S400.

When the value performed by the current auto-mode (mode performance value) for one of the air-conditioning load values is determined by manual operation, the air conditioning system is operated in accordance with the manual operation value desired by the user, but when the air-conditioning load value changes, the air conditioning system can be operated in accordance with the set reference value corresponding to the new air-conditioning load value. This may provide a sudden change to the user, so that, for a gradual change of the mode performance value according to a gradual change of the air-conditioning load value, the learning step S600 may calculate and store an intermediate value between a first manual operation value corresponding to a first air-conditioning load value and a set reference value corresponding to a second air-conditioning load value close to the first manual operation value or between the first manual operation value and a second manual operation value close to the first manual operation value.

In more detail, referring to FIG. 2, a plurality of setting points are determined for air-conditioning load values, and when there is manual operation for the setting points or the region between the setting points, set values c corresponding to the air-conditioning load values between the corresponding air-conditioning load value a and the setting point b close to the corresponding air-conditioning load value a can be calculated by interpolation.

When there is another set operation value d determined in advance between the a manual operation value and the setting point b close to the manual operation value, the values between the set operation value and the set operation value d can be calculated by interpolation.

In certain embodiments, an intermediate value theorem may be used instead of interpolation and other various methods may be used for calculating set values between two values.

Figure 3:
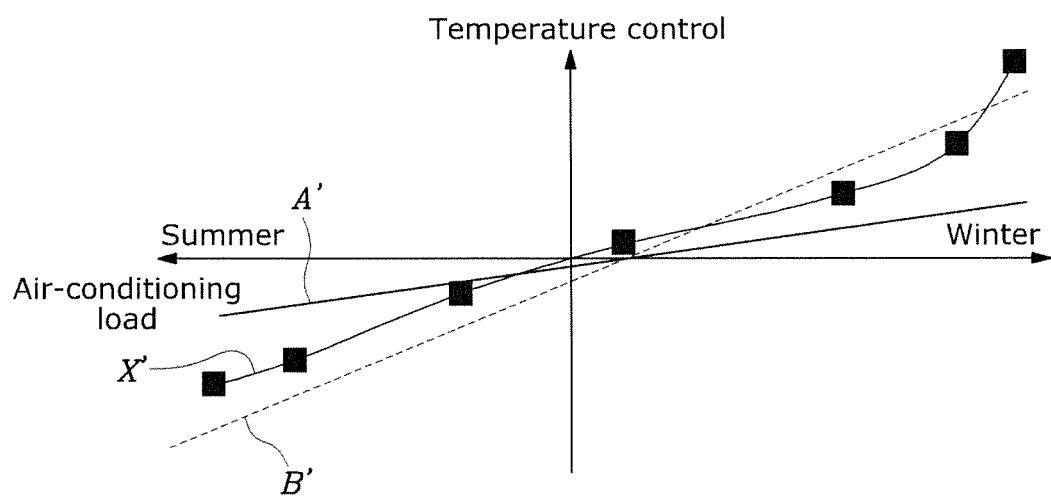
FIG. 3 is a diagram showing set values corresponding to air-conditioning load values at predetermined temperatures.

FIG. 3 is a diagram showing set values corresponding to air-conditioning load values at predetermined temperatures, in which temperature setting may also be made similar to the setting of the amount of air. There are a set reference value B' and a lowest set value A'. The set reference value B', which is a value applied when an auto-mode is performed for an air-conditioning load value without manual operation, may be a temperature value determined in advance in accordance with an air-conditioning load value through a test by the manufacturer.

The setting of temperature may be applied similar to the setting of the amount of air in most cases, but temperature may be a negative value, depending on an air-conditioning load value, as shown in FIG. 3, in which the set operation value X' or the set reference value B' may be smaller than the lowest set value A'. However, this is because the temperature is a negative value, so similar to the setting of the amount air, the learning step S600 may be performed with comparative absolute values.

Figure 4:
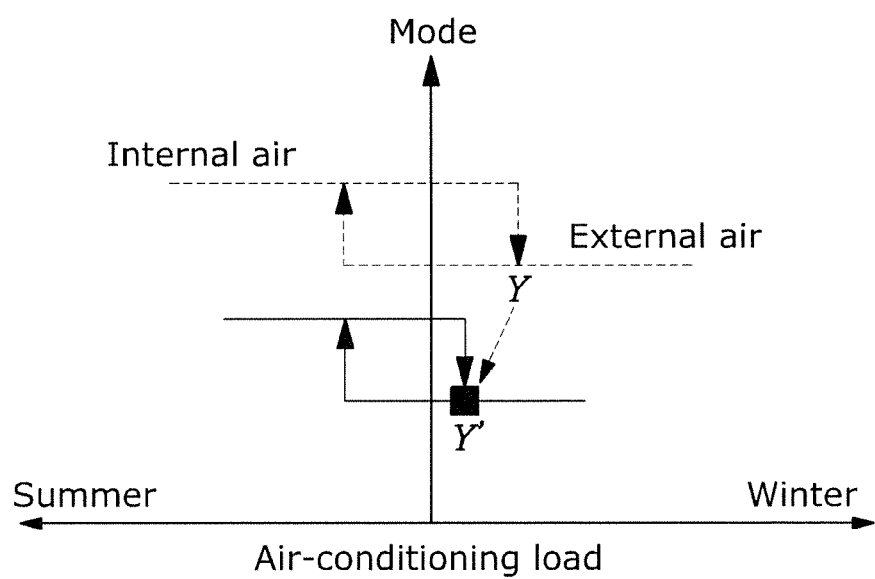
FIG. 4 is a diagram showing changes in internal/external air mode according to air-conditioning load values.

FIG. 4 is a diagram showing changes in internal/external air mode according to air-conditioning load values. The settings in which only on/off control is possible such as the internal/external air mode, for example, the setting of an air conditioning system and the setting of a blowing mode can be performed for the air-conditioning load when the mode is changed.

For example, in FIG. 4, the point of time over the air-conditioning load value when an internal air state is converted into an external air state can be changed from a set reference value Y to a set operation value Y', and this may be similar to the point of time when the external air state is converted into the internal air state.

There may be several points of time where there is a change between the internal air state and the external air state over an air-conditioning load value due to an increase or a decrease in air-conditioning load, and the points of time with a change from the internal air state to the external air state or from the external air state to the internal air state may be independently stored.

This may be similarly applied to all of on/off control such as the setting of an air conditioning system and the setting of a blowing mode, including the conversion between internal/external air states, and the set reference value and the set operation value may be a point of time over an air-conditioning load.

In the learning step S600, the set operation value may be stored in a portable memory of a communication system in a vehicle or an external device that can communicate with the outside to be transmitted to the outside or displayed on the external device.

The set operation value may be edited, corrected, and then stored in the device, and a memory having the corrected set value may be mounted on a vehicle or data may be transmitted back to the vehicle so that the data can be applied to the steps.

In the embodiment, although the set values for detected air-conditioning load values are stored, various values such as an interior temperature value or other various values may be used instead of the air-conditioning load values.

According to the method of controlling an automotive air conditioning system having the configuration described above, since the amount of air and the blowing mode can be determined appropriately for the individual preferences of users, it is possible to improve convenience and satisfaction for the users and increase usability of the auto-mode with minimum manual operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of controlling an automotive air conditioning system, the method comprising:
    a mode checking step of checking whether the air conditioning system is in an auto-mode;
    an operation recognizing step of recognizing whether the air conditioning system is manually operated in the auto-mode;
    a learning step of setting and storing at least one manual operation value, when the air conditioning system is manually operated, and then operating the air conditioning system in accordance with the at least one stored manual operation value in a next auto-mode,
    a load determining step of determining one or more air-conditioning load values,
    wherein the learning step further includes storing one or more of the air-conditioning load values when the air conditioning system operates, and
    wherein in the load determining step, the load is determined using the equation, $$Q_{AC} = M_r C_p \frac{dT_r}{dt} - \{-m_l(h_a - h_r) - Q_{env} - Q_i - Q_{solar} - Q_{ENG} - Q_{etc}\}$$

where $Q_{A/C}$ is an amount of heat to be supplied or removed, $M_r$ is the mass of interior air, $C_p$ is the specific heat of air, $T_r$ is an interior temperature, t is time, $m_l$ is a flow rate of leaking air, $h_a$ is the enthalpy of external air, $h_r$ is the enthalpy of the interior air, $Q_{env}$ is a degree of cooling or heating by external convection, $Q_i$ is an amount of heat of at least one interior device, $Q_{solar}$ is an amount of radiant heat from the sun, $Q_{eng}$ is an amount of heat received from an engine, and $Q_{etc}$ is an amount of other possible heat.

2. The method of claim 1, wherein the operation recognizing step includes detecting whether the air conditioning system has been operated for set values related to setting of an amount of air, setting of temperature, setting of internal/external air mode, setting of the air conditioning system, or setting of blowing mode.

3. The method of claim 1, further comprising a mode performing step of performing the auto-mode in accordance with at least one mode performance value corresponding to at least one of the determined air-conditioning load values.

4. The method of claim 3, further comprising
a reset step of detecting reset signals and, when the reset signals are detected, resetting all the mode performance values,
wherein the mode performing step includes performing the auto-mode in accordance with a set reference value set for each of the air-conditioning load values, when the mode performance values are reset.

5. The method of claim 3, wherein the at least one mode performance value is a first stored manual operation value, a set reference value, a first intermediate value between the first stored manual operation value and the set reference value, or a second intermediate value between the first stored manual operation value and a second stored manual operation value.

6. The method of claim 5, wherein the at least one mode performance value is the first intermediate value or the second intermediate value.

7. The method of claim 1, wherein one of the manual operation values is equal to or larger than lowest set values determined for each of the air-conditioning load values.

8. The method of claim 1, wherein a set reference value is provided for each of the air-conditioning load values, and
the learning step includes determining and storing an intermediate value between a first manual operation value and the set reference value corresponding to one of the air-conditioning load values, the set reference value being close to the first manual operation value, or between the first manual operation value and another manual operation value close to the first manual operation value.

9. The method of claim 8, wherein the intermediate value is determined by interpolation.

10. The method of claim 1, wherein $Q_{A/C}$ includes the sum of an amount of heat required for the interior temperature to reach to a set temperature and an amount of heat required to maintain the interior temperature at the set temperature.

11. The method of claim 1, wherein $Q_{etc}$ includes the heat of a human body.

12. The method of claim 1, wherein $Q_i$ includes the heat of a seat.

* * * * *